United States Patent
Mintz et al.

(10) Patent No.: US 7,490,941 B2
(45) Date of Patent: Feb. 17, 2009

(54) THREE-DIMENSIONAL HOLOGRAM DISPLAY SYSTEM

(75) Inventors: Frederick Mintz, Chatsworth, CA (US);
Tien-Hsin Chao, Valencia, CA (US);
Nevin Bryant, La Canada, CA (US);
Peter Tsou, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 198 days.

(21) Appl. No.: 11/216,803

(22) Filed: Aug. 30, 2005

(65) Prior Publication Data

US 2006/0171008 A1    Aug. 3, 2006

Related U.S. Application Data

(60) Provisional application No. 60/605,851, filed on Aug. 30, 2004.

(51) Int. Cl.
*G03B 21/00* (2006.01)
*G03B 21/28* (2006.01)
*G03H 1/00* (2006.01)
*G03H 1/26* (2006.01)
*G02B 5/32* (2006.01)
*G02F 1/135* (2006.01)

(52) U.S. Cl. .............. 353/7; 353/33; 353/81; 353/50; 353/122; 359/14; 359/15; 359/23; 349/30

(58) Field of Classification Search .............. 353/7, 353/33, 81, 50, 122; 359/1, 14–16, 18, 23–24; 349/30; 348/719

See application file for complete search history.

(56) References Cited

U.S. PATENT DOCUMENTS

| 6,195,184 B1 * | 2/2001 | Chao et al. .......... 359/32 |
| 6,844,948 B2 * | 1/2005 | Lieberman .......... 359/23 |

* cited by examiner

*Primary Examiner*—Diane I Lee
*Assistant Examiner*—Magda Cruz
(74) *Attorney, Agent, or Firm*—Tope-McKay & Associates (57) ABSTRACT

The present invention relates to a three-dimensional (3D) hologram display system. The 3D hologram display system includes a projector device for projecting an image upon a display medium to form a 3D hologram. The 3D hologram is formed such that a viewer can view the holographic image from multiple angles up to 360 degrees. Multiple display media are described, namely a spinning diffusive screen, a circular diffuser screen, and an aerogel. The spinning diffusive screen utilizes spatial light modulators to control the image such that the 3D image is displayed on the rotating screen in a time-multiplexing manner. The circular diffuser screen includes multiple, simultaneously-operated projectors to project the image onto the circular diffuser screen from a plurality of locations, thereby forming the 3D image. The aerogel can use the projection device described as applicable to either the spinning diffusive screen or the circular diffuser screen.

19 Claims, 9 Drawing Sheets

THREE-DIMENSIONAL HOLOGRAM DISPLAY SYSTEM

PRIORITY CLAIM

The present application is a non-provisional patent application, claiming the benefit of priority of U.S. Provisional Patent Application No. 60/605,851, filed on Aug. 30, 2004, entitled, "Multi-Point Viewable Static and Dynamic Holograms."

STATEMENT OF GOVERNMENT INTEREST

The invention described herein was made in the performance of work under a NASA contract and is subject to the provisions of Public Law 96-517 (35 U.S.C. 202) in which the Contractor has elected to retain title.

BACKGROUND OF THE INVENTION (1) Technical Field

The present invention relates to a system for forming a three-dimensional holographic display. More specifically, to a three-dimensional holographic display system that allows a user to view the hologram from a plurality of points and angles, up to 360 degrees around the display.

(2) Description of Related Art

The world in which we live is a three-dimensional (3D) world. However, most of the images created are only in two dimensions (2D). In an attempt to improve upon traditional images, several innovations have been conceived to more accurately represent our 3D environment. By way of example, 3D television shows and theme park attractions have been created. Unfortunately, however, a viewer must wear special glasses to experience these 3D images. Such 3D image displays are achieved by simultaneously projecting two parallax views acquired from a 3D object onto a screen. In such a display, viewers must wear a polarization goggle to view the 3D images. Recently, many new technologies have been developed that have removed the need for glasses.

3D display companies are only starting to develop prototypes for specific businesses that focus on entertainment and product design, but these prototypes are not practical for general applications and average consumers. Following are several exemplary companies that are developing various 3D displays.

Actuality Systems, Inc., located at 213 Burlington Road, Bedford, Mass. 01730, U.S.A., developed the Perspecta® display. The Perspecta® display works by projecting several thousand 2D images per second onto a rotating screen using Texas Instrument's digital micro-mirror device (DMD) chips. Texas Instrument is located at 13532 N. Central Expressway, M/S 3807, Dallas, Tex. 75243-1108, U.S.A. Similar to television, the eye fuses these images together to create a seamless image. The raster-scan display renders resolution, binary images at 768×768 pixels. Each scan projects 198 images, approximately 1.1 images per degree of rotation, and 24 scans per second. The DMDs can project binary images with 5 kilohertz (kHz) speed. However, Perspecta® display can only render 3-bit color (with 3 DMD chips) and limited gray scale images.

Deep Video Imaging, Ltd. has developed a 3D display called Actualdepth. Deep Video Imaging, Ltd. is located at Airport Road RD2, Mystery Creek, Hamilton, 02021, New Zealand. Actualdepth uses two layers of liquid crystal display (LCD) panels to create the illusion of depth. The company appears to be targeting kiosks and point of purchase displays instead of computer desktop applications, like some of the other developers.

Dimension Technologies, Inc. (DTI) has developed liquid crystal displays (LCD's) that display 3D images without the need for imaging glasses. DTI is located at 315 Mt. Read Boulevard, Rochester, N.Y. 14611, U.S.A. The technical term for DTI's technology is "autostereoscopic, 3D imaging", i.e., placing a single active substrate between the LCD and its back lighter. When turned on it allows the display to show real 3D images by creating light lines. These light lines are placed behind a conventional LCD panel, creating what DTI calls a Virtual Window™. The Virtual Window™ is essentially an LCD screen that gives the appearance of a 3D image.

Dresden 3D GmbH, now owned by SeeReal Technologies, creates a 3D display on an LCD screen. SeeReal Technologies is located at Blasewitzer Straße 43, 01307 Dresden, Germany. The Dresden 3D Display (D4D) is an 18.1" thin-film transistor (TFT) LCD, similar to the largest Virtual Window™ by DTI. The D4D includes eye tracking that allows viewers to have the freedom to view 3D images from various angles by tracking the location of their head and changing the aspect of the hologram respectively. In addition to operating as a primary monitor, Dresden is also marketing the D4D as a secondary display that will compliment a normal monitor. Because of this, Dresden optionally bundles a FireGL 3 graphics board with the D4D. The FireGL 3 is capable of driving two displays simultaneously. A keyboard shortcut allows a user to toggle the 3D display on and off when two displays are used. Another feature of the FireGL 3 is that any OpenGL program can be set to output stereo 3D images to the D4D. The FireGL 3 is a high-end graphics card created by ATI technologies, Inc., located at 1 Commerce Valley Drive East, Markham, Ontario, Canada L3T 7X6.

Holografika produces the HoloVizio line of displays. Holografika is located at Pf. 100, Budapest, H-1704, Hungary. The HoloVizio displays include 3D images on a monitor screen, allowing a viewer to walk around the screen in a wide field-of-view and see the objects and shadows moving continuously as in the normal perspective. Using a Holovizio display, it is possible see behind objects; while hidden details appear, others disappear (motion parallax). The displays are currently available in 32" (16:9) and 26" (4:3) screen sizes.

LightSpace Technologies, Inc. produces the DepthCube Z1024 3D display. LightSpace Technologies, Inc. is located at 26 Pearl Street, Norwalk, Conn. 06850, U.S.A. The Depth-Cube Z1024 3D display consists of 20 stacked LCD shutter panels, with video projected through the LCD shutters, thereby allowing viewers to see objects in three dimensions without the need for glasses. Unlike auto-stereoscopic displays, DepthCube technology doesn't limit the field-of-view, allowing multiple people to experience the 3D effect simultaneously.

The above techniques still have problems. For example, the Actuality Perspecta® display has very limited color and gray scales, limiting the display to show simple images only. Additionally, none of the currently available techniques allow for walk around displays.

Thus, a need exists in the art for a 3D display that allows a viewer to walk 360 degrees around the display and see a life size or reduced, 3D volumetric image in real-time.

SUMMARY OF THE INVENTION

The present invention describes a three-dimensional (3D) hologram display system. The 3D hologram display system comprises a projector device configured to project an image, and a display medium for displaying the image from the projector device as a holographic image, such that a viewer can view the holographic image from multiple view points. When the holographic image is projected upon the display medium, a viewer can view different aspects of the holographic image from different angles.

In another aspect, the projector device further comprises multiple, simultaneously-operable projectors for projecting image components. Each image component is one half of a stereo image, such that when two corresponding halves of a stereo image converge upon the display medium, they form a full stereogram.

In another aspect, the present invention further comprises an image formation mechanism for redirecting the image components onto the display medium to form the holographic image.

In yet another aspect, the image formation mechanism is selected from a group consisting of multiple refracting prisms and multiple reflecting mirrors.

In another aspect, the display medium is selected from a group consisting of a circular diffuser screen, and aerogel.

Additionally, the image formation mechanism is formed in a ring-shape such that the image components can be reflected to the interior of the display medium.

In another aspect, each multiple, simultaneously-operable projector is positioned such that each half of the stereo image is refracted/reflected by every other prism or mirror in the image formation mechanism to converge upon the display medium and form the holographic image.

In another aspect, the present invention further comprises a processor configured for processing the image and presenting the image to the projector device to be projected as a 3D hologram onto the display medium.

In yet another aspect, the projector device is positioned such that it is within the ring-shape of the image formation mechanism.

In another aspect, the projector device is formed in a circular mounting frame such that it surrounds the ring-shape of the image formation mechanism.

In another aspect, the projector device further includes: three grayscale spatial light modulators (SLM) that are used to display red, green, and blue (RGB) data separately, where the RGB data is received from a graphic 3D data processor; three red, green, and blue light sources to illuminate each SLM with three beams; an achromatic, optics light ray combiner to combine the three beams to become a collinear beam; and an input lens for passing the collinear beam through the input lens to illuminate the display medium.

Furthermore, the display medium is selected from a group consisting of a spinning diffusive screen and aerogel.

Finally, as can be appreciated by one in the art, the present invention is not limited to the 3D hologram system, but also includes a method and computer program product for forming such a hologram and system. The method comprises acts of forming each of the respective parts of the 3D hologram display system herein such that they form the 3D image. Additionally, the computer program product comprises computer-readable instruction means stored on a computer readable medium for causing a computer to process an image and project the image as a 3D image. The computer program product is further configured to operate the respective portions of the 3D hologram display system according to the present invention.

BRIEF DESCRIPTION OF THE DRAWINGS

The objects, features and advantages of the present invention will be apparent from the following detailed descriptions of the preferred aspects of the invention taken in conjunction with reference to the following drawings, where.

DETAILED DESCRIPTION

The present invention relates to a system for forming a three-dimensional holographic display. More specifically, to a three-dimensional holographic display system that allows a user to view the hologram from a plurality of points and angles, up to 360 degrees around the display. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is given as a central resource for the reader. Next, a description of various principal aspects of the present invention is provided. Third, an introduction is provided to provide the reader with a general understanding of the present invention. Finally, a description of various aspects of the present invention is provided to give an understanding of the specific details.

(1) Glossary

Before describing the specific details of the present invention, a glossary is provided in which various terms used herein and in the claims are defined. The glossary is intended to provide the reader with a general understanding for the intended meaning of the terms, but is not intended to convey the entire scope of each term. Rather, the glossary is intended to supplement the rest of the specification in more accurately explaining the terms used.

Aerogel—The term "aerogel" refers to a silicon-based solid with a porous, sponge-like structure in which approximately 99.8 percent of the volume is empty space.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer readable medium such as a floppy disk, a CD-ROM, and a flash drive.

Multiple Viewpoints—The term "multiple viewpoints" refers to the view-ability of an image that is not flat and that is viewable from a plurality of points and angles, up to and including 360 degrees of viewing.

Spatial Light Modulator—The term "spatial light modulator (SLM)" refers to an array of optical elements (pixels) in which each pixel acts independently as an optical "valve" to adjust or modulate light intensity.

(2) Principal Aspects

The present invention has three "principal" aspects. The first is a three-dimensional (3D) hologram system. The 3D hologram system is typically in the form of a computer system operating software or in the form of a "hard-coded" instruction set that is configured to operate a device capable of projecting and displaying a 3D holographic image. The 3D hologram system also includes the corresponding projection and display devices. The second principal aspect is a method, typically in the form of software, operated using a data processing system (computer). The method also includes acts of forming the 3D hologram display system described herein. The third principal aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read-only memory (ROM), and flash-type memories. These aspects will be described in more detail below.

Figure 1:
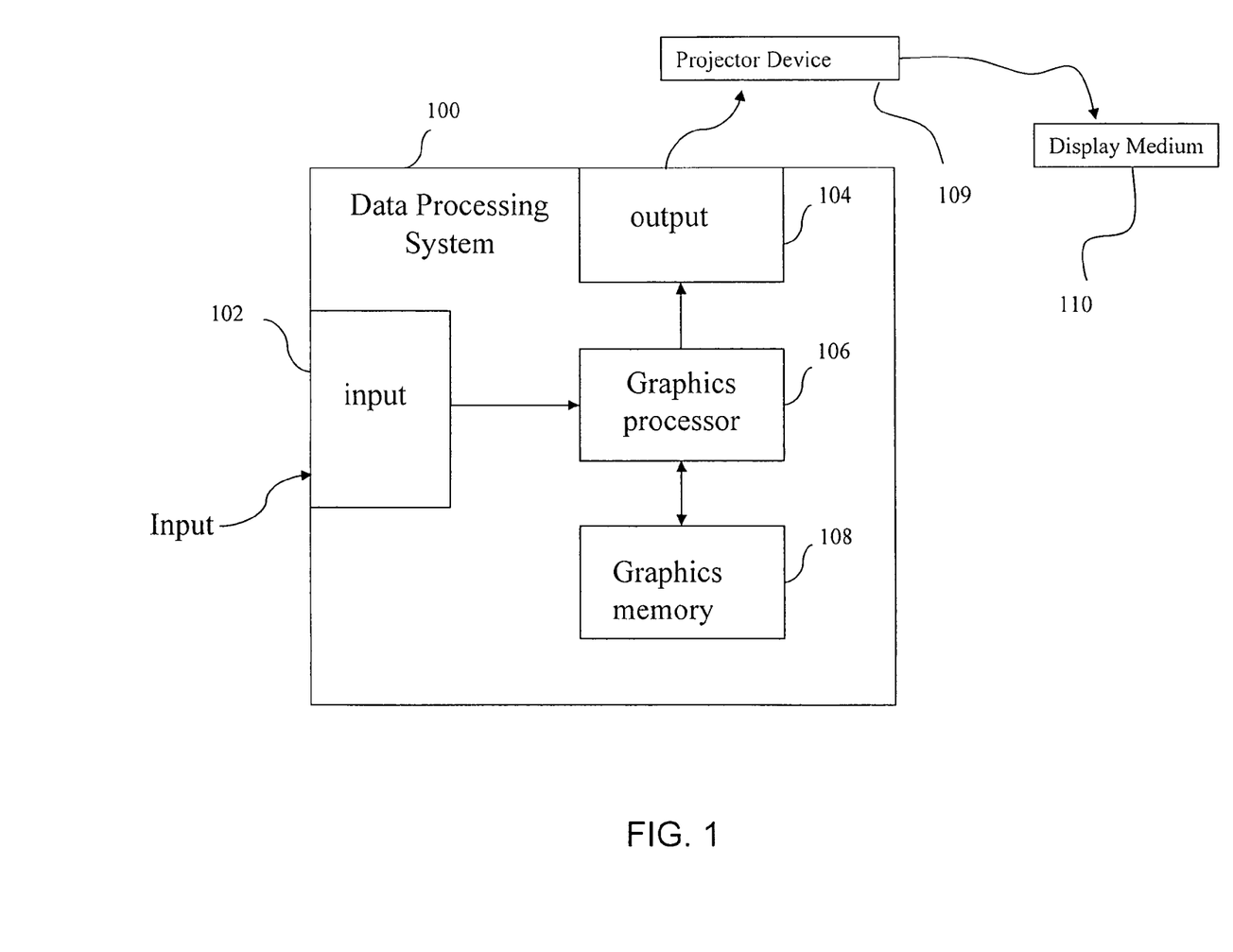
FIG. 1 illustrates a component diagram depicting components of a three-dimensional (3D) hologram display system according to the present invention.

A block diagram depicting the components of a three-dimensional (3D) hologram system 100 of the present invention is provided in FIG. 1. The 3D hologram system is used to control the system and to display the image sequence. The hardware system implementation requires precision optics, high speed data transfer and large display memory, as well as other enhancements. The 3D hologram system 100 comprises an input 102 for receiving an image to process and project as a 3D image. Note that the input 102 may include multiple "ports." An output 104 is connected with the processor for providing signals to at least one projector 109 for projecting the image as a 3D hologram onto a display medium 110 (e.g., diffuser screen or aerogel). Output may also be provided to other devices or other programs; e.g., to other software modules, for use therein. The input 102 and the output 104 are both coupled with a processor 106, which may be a general-purpose computer processor or a specialized processor designed specifically for use with the present invention (i.e., a 3D graphics processor). The processor 106 is coupled with a memory 108 to permit storage of data and software to be manipulated by commands to the processor.

Figure 2:
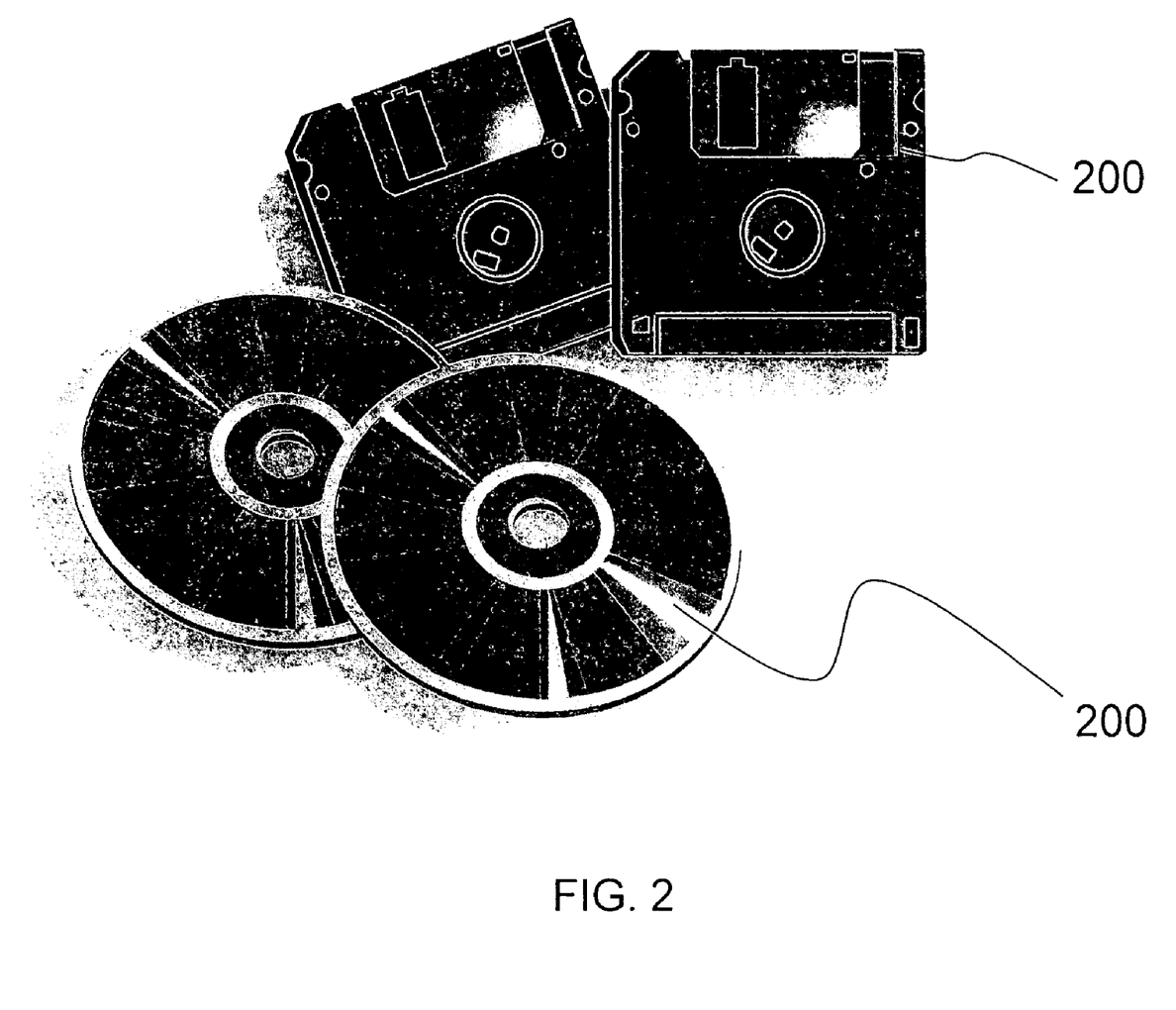
FIG. 2 illustrates a diagram of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer readable code stored on any compatible computer readable medium. The computer program product is configured to perform the operations of processing and projecting the 3D hologram as described herein.

(3) Introduction

The present invention discloses a new approach to the display of holograms which can be viewed either with or without stereo glasses in a configuration which allows the viewer to walk around the display, viewing different aspects of the same three dimensional (3D) models or original objects, taken by multiple stereoscopic cameras or generated by other means. Alternatively, multiple viewers may view the different aspects of the same original or the same aspect (view) at the same time.

In one aspect, the present invention uses multiple, simultaneous, stereo projections, the images of which are optically formed by multiple refracting prisms or reflecting mirrors (i.e., image formation mechanism), such that the images are formed and visually justified or accurately displayed on a diffuser screen (e.g., circular diffuser screen), which is located in appropriate locations, such as above the projector-refractor/reflector array so as to allow space for the equipment. Additionally, the image can be displayed on an aerogel that allows for 3D walk-around viewing. In another aspect, the image is formed using spatial light modulators and is projected onto a flat, rotating diffusive screen.

3D displays are achieved by projected data, either collected from stereo imaging cameras or from computer simulation. The display techniques can be classified into two categories: 1) Using a CRT or LCD monitor to project two angularly separated images (each from one of two stereo cameras or from a simulated database) into the viewer's eye, and as applicable to the present invention, 2) Graphic rendering the stereo input and use it to control a "spatial light modulator" or light scanner projected onto a display medium. As a result, 3D images can be perceived in space. The viewer can perceive the same 3D image from any angle without having to wear special goggles. The perceived 3D does not have parallax since the source of the 3D data came from the stereo imaging type of input.

(4) Description of Various Aspects

As touched upon above and described in further detail below, the present invention includes three types of display media for reflecting and displaying the 3D image. The first being a spinning diffusive screen, where an image is projected onto the surface of a spinning diffusive screen in a time-multiplexing manner. The second display medium is a circular diffuser screen, where images are projected onto the surface of the circular diffuser screen, while the third is an aerogel material, where images are projected into the aerogel material to form the 3D image.

(4.1) Spinning Diffusive Screen

Figure 3:
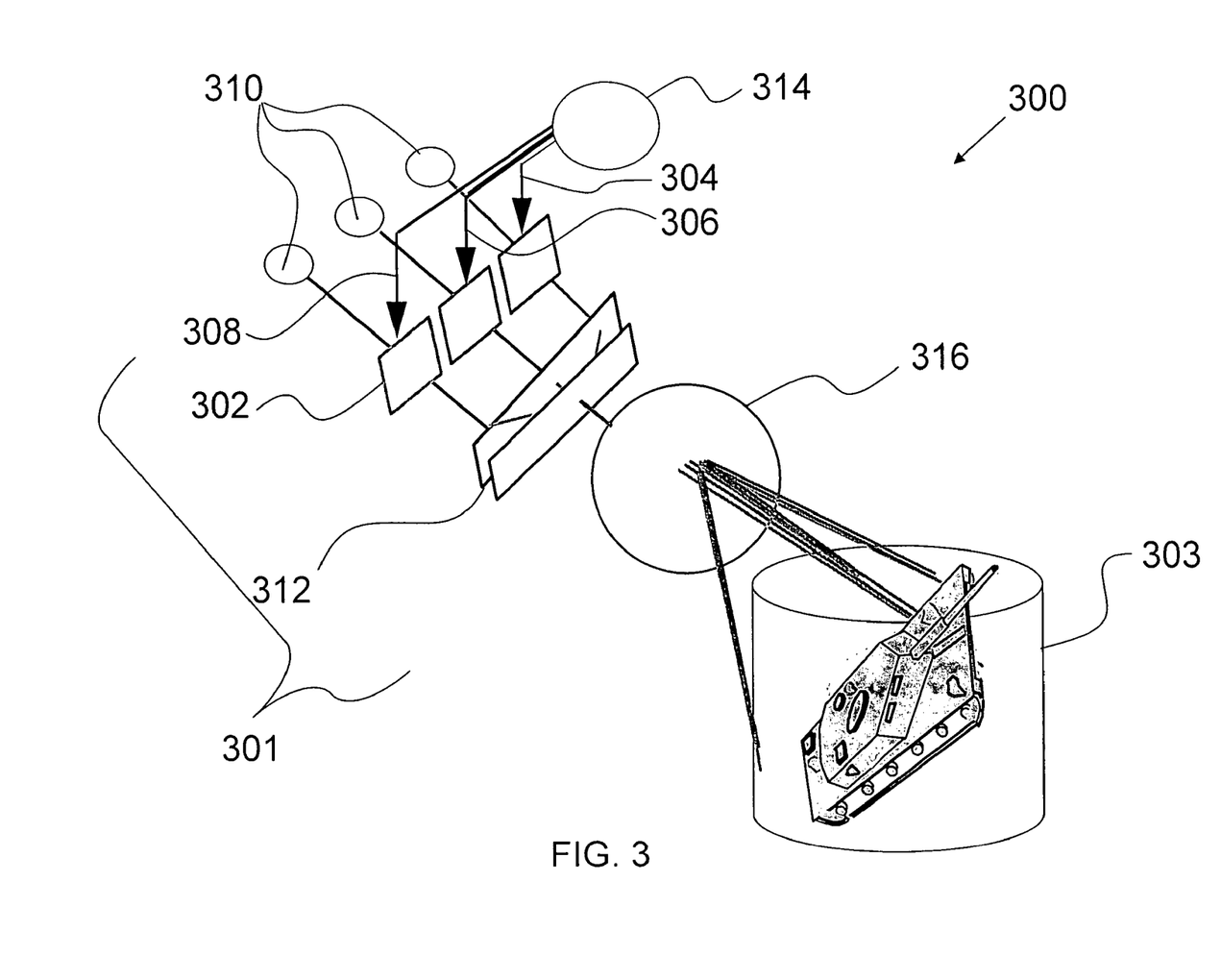
FIG. 3 is an illustration of system schematic of a 3D hologram display system according to the present invention, where a spinning diffusive screen is used to display a 3D image.

The system schematic diagram of the 3D hologram system 300 using a spinning diffusive screen (i.e., display medium) is shown in FIG. 3. A projector device 301 is used to project a holographic image onto the display medium 303. The projector device 301 includes three grayscale spatial light modulators (SLM) 302 that are used to display red 304, green, 306, and blue 308 (RGB) data separately. Three red, green and blue light sources (i.e., laser or light emitting diodes (LEDs)) 310 will illuminate each SLM. The three beams are combined by an achromatic, optics light ray combiner 312 to become collinear. The three SLMs will be driven by data from a graphic 3D data processor 314. The throughput light rays pass through an input lens 316 to illuminate the display medium 303.

Figure 4:
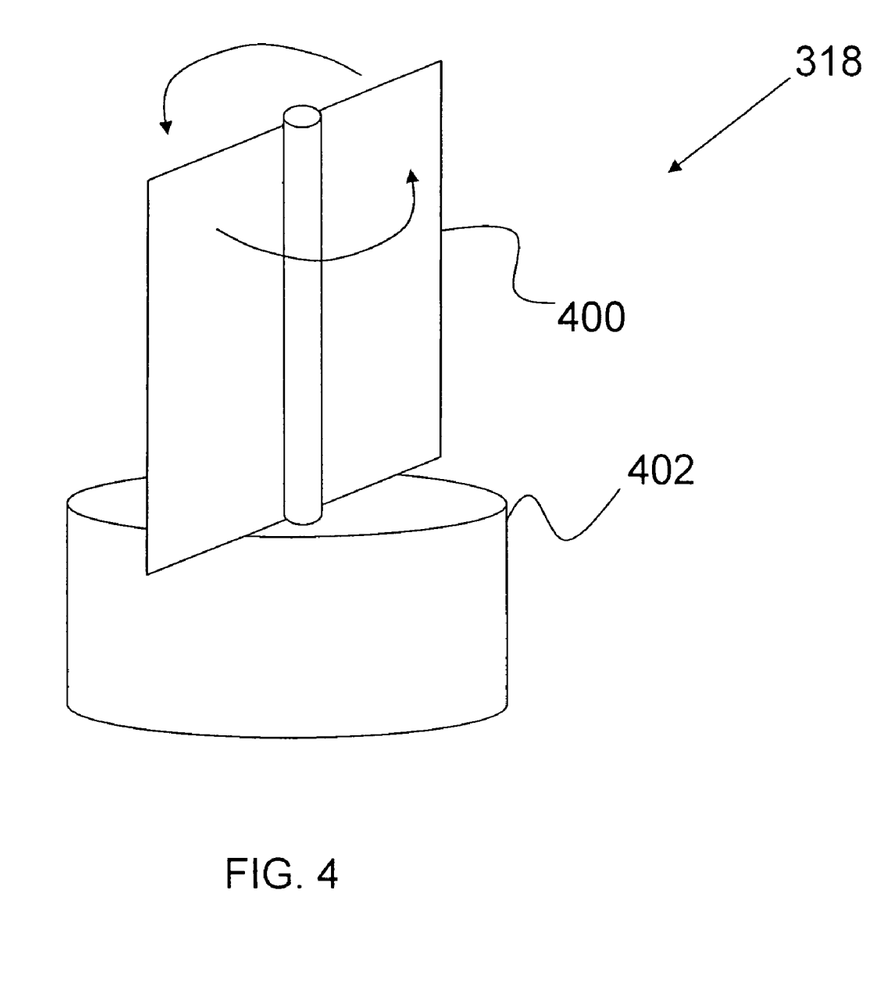
FIG. 4 is an illustration of spinning diffusive screen according to the present invention.

In this aspect and as shown in FIG. 4, the display medium 303 is a rotating diffusive screen 400 placed at the output imaging plane. In this aspect, the rotating diffusive screen 400 is powered by a motor 402 to rotate the screen 400 at a speed that is appropriate to reflect and display an image. Thus, a 3D image can be displayed on the rotating screen 400, in a time-multiplexing manner.

An advantage of the architecture of the present invention is the data throughput rate. The present invention utilizes a spatial light modulator, such as that recently developed by Jet Propulsion Laboratories (JPL) and the Boulder Nonlinear Systems (BNS), with high-speed (up to 4 kHz) and grayscale (8-bits instead of binary) capability that is far superior to the Deformable Mirror Device (DMD) being used by the Actuality Device system. JPL is located at 4800 Oak Grove Drive, Pasadena, Calif. 91109, U.S.A. BNS is located at 450 Courtney Way, #107, Lafayette, Colo. 80026, U.S.A. Additionally, software development tools are used that convert general 3D models to intercept OpenGL data and effectively slice it for display across the screen panels. For example, such 3D software development tools include a 3D volume display application programming interface (API)/toolkit, a volumetric rendering algorithm, and a 3D volume memory format management program.

(4.2) Circular Diffuser Screen

Figure 5:
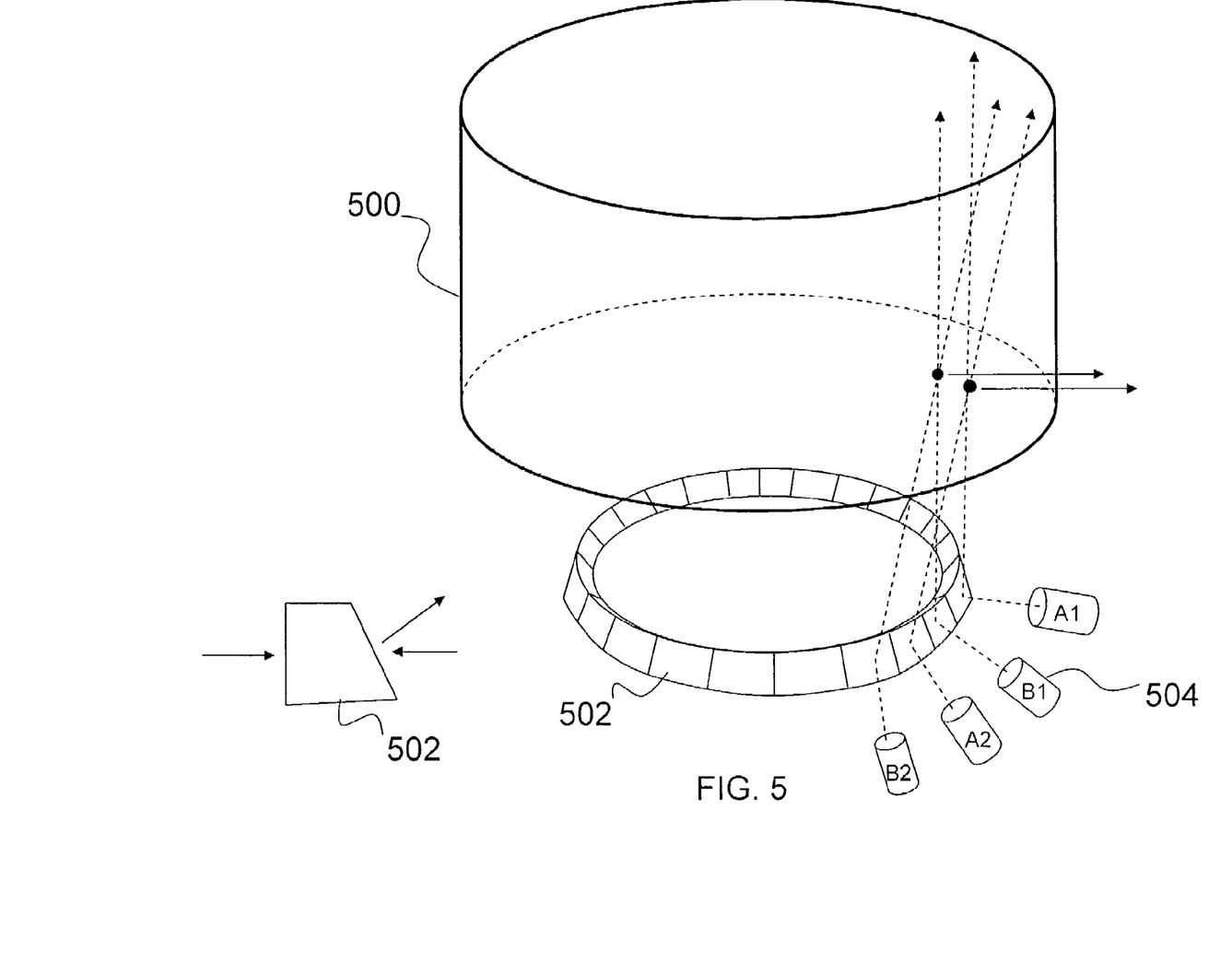
FIG. 5 is an illustration of a 3D hologram display system according to the present invention, where a circular diffuser screen is used to display the 3D image.

Another aspect of the present invention uses a circular diffuser screen as the display medium. As shown in FIG. 5, a circular diffuser screen 500 is used to display the 3D image. As can be appreciated by one skilled in the art, there are numerous methods and techniques for forming a circular diffuser screen 500 capable of displaying an image. For example, a flat sheet of diffuser material is bent around to form a column. The dimensions of the column are delimited by current manufacturing specifications and end-use applications. The ends of the sheet are joined to form a seamless joint so as not to distort the image projected at the diffuser screen at that spot. A non-limiting example of such diffuser material is that made by Physical Optics Corp. Physical Optics Corp. is located at 20600 Gramercy Place, Building 100, Torrance, Calif. 90501-1821, U.S.A.

As shown in FIG. 5, an image formation mechanism 502 is included and shaped in such a way as to take parallel lines of light or otherwise normal images and re-form them onto the circular diffuser screen 500, such that the original image appears normal and fully justified as the displayed image. The image formation mechanism 502 is either a reflecting surface or a refracting prism, depending upon which direction the image is projected from and upon the diffuser screen 500.

For example, if the image input is from the opposite side, then the image formation mechanism 502 becomes a reflecting mirror. In either case, the image is formed and projected in such a way that a fully justified image appears on the diffuser screen 500.

Also as shown in FIG. 5, the image formation mechanism 502 may include a plurality of refractors or reflectors, mounted in a circle such that multiple images are transmitted onto the circular diffuser screen 500 by a projector device 504. The projector devices 504 are ordered in a circular mounting frame such that each stereo image is refracted/reflected by every other prism or mirror in the ring-shaped image formation mechanism 502. The projector devices 504 are any suitable projection mechanism or device for projecting an image.

If a succession of stereo images, taken by a succession of stereo cameras, in order, are projected to the image formation mechanism 502 and thereafter onto the circular diffuser screen 500, then a 360° (a true rendering) of the original image will be shown on the screen 500. If viewers wish to see the same aspect (angular view) of the original object, then all projector devices 504 can be used to project the same image simultaneously.

Use of the circular diffuser screen 500 relies on projecting each half of a stereo image onto the image formation mechanism 502, with the two halves coming together on the circular diffuser screen 500. As shown in FIG. 5, a plurality of projector devices 504 (e.g., video projectors) are mounted side by side, in alternate order, to project image components. In other words, the first-stereo-half (e.g., the left half) of the first aspect (angular view) of an object is projected by Projector A1, while the right-stereo-half of the first aspect of that view will be projected by Projector A2, and so forth. Each stereo pair is projected by alternating stereo projector devices 504 so as to produce a hologram onto the circular diffuser screen 500. If necessary, uniform microsecond delays can be introduced to the system if stereo glasses are to be used for viewing.

Although described herein as being mounted in alternate order, one skilled in the art can appreciate that the present invention is not intended to be limited thereto, as there are other configurations to create a space between each half of a stereo image.

Figure 6A:
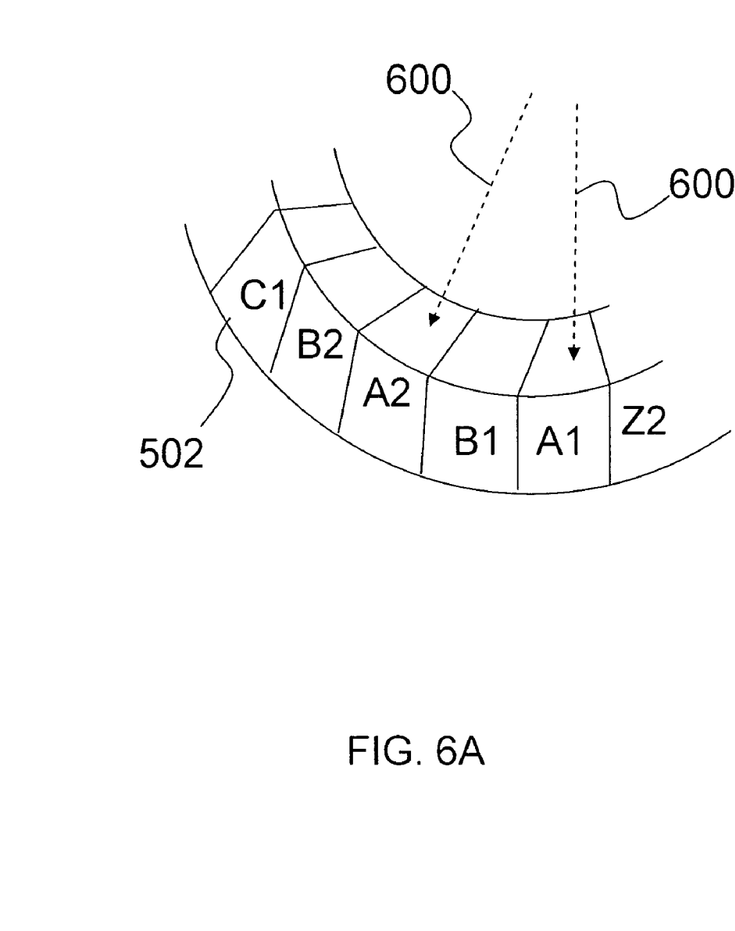
FIG. 6A is an illustration of an exemplary assembly order of successive refractor/reflector pairs (i.e., image formation mechanism) which match the displacement of a projector device array.

FIG. 6A is an illustration of an exemplary assembly order of each successive refractor/reflector pair (i.e., image formation mechanism 502) which matches the displacement of the projector device 504 array. The interpupillary displacement of human eyes is approximately 7.0 centimeters. In one aspect, it is useful to take advantage of this natural parallax system in the design of the 3D hologram display system. For example, the placement of stereo cameras, projectors, and refractor/reflectors and/or the use of image delay mechanisms may be adjusted to account for the natural parallax system. As a specific example, the distance between each corresponding refractor/reflector (e.g., A1 and A2) in the image formation mechanism 502 may be approximately 7.0 centimeters.

As discussed above, two halves of a stereo image (each being one half of a stereo image 600) are projected to the image formation mechanism 502, which then directs each half of the stereo image 600 to converge onto the circular diffuser screen.

Figure 6B:
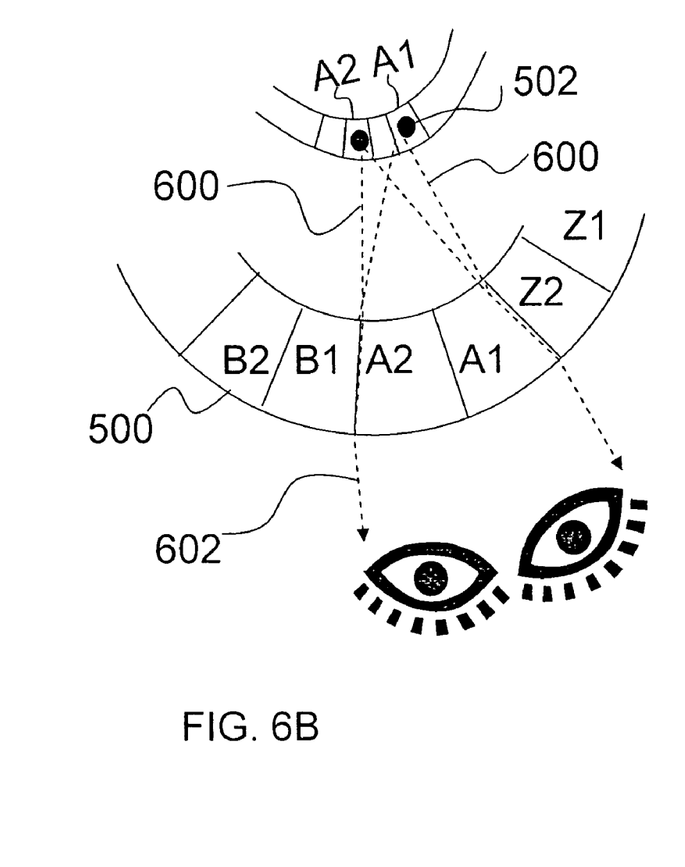
FIG. 6B is an illustration of an exemplary convergence of the refracted or reflected images (i.e., half of the stereo image) onto the circular diffuser screen to form a full stereogram (hologram)

FIG. 6B is an illustration of an exemplary convergence of the refracted or reflected images (i.e., half of the stereo image) onto the circular diffuser screen 500 to form a full stereogram (hologram) 602. As can be appreciated by one skilled in the art, once the hologram is formed, it may be viewed from multiple positions and angles, thereby forming a truly 3D hologram.

Figure 7:
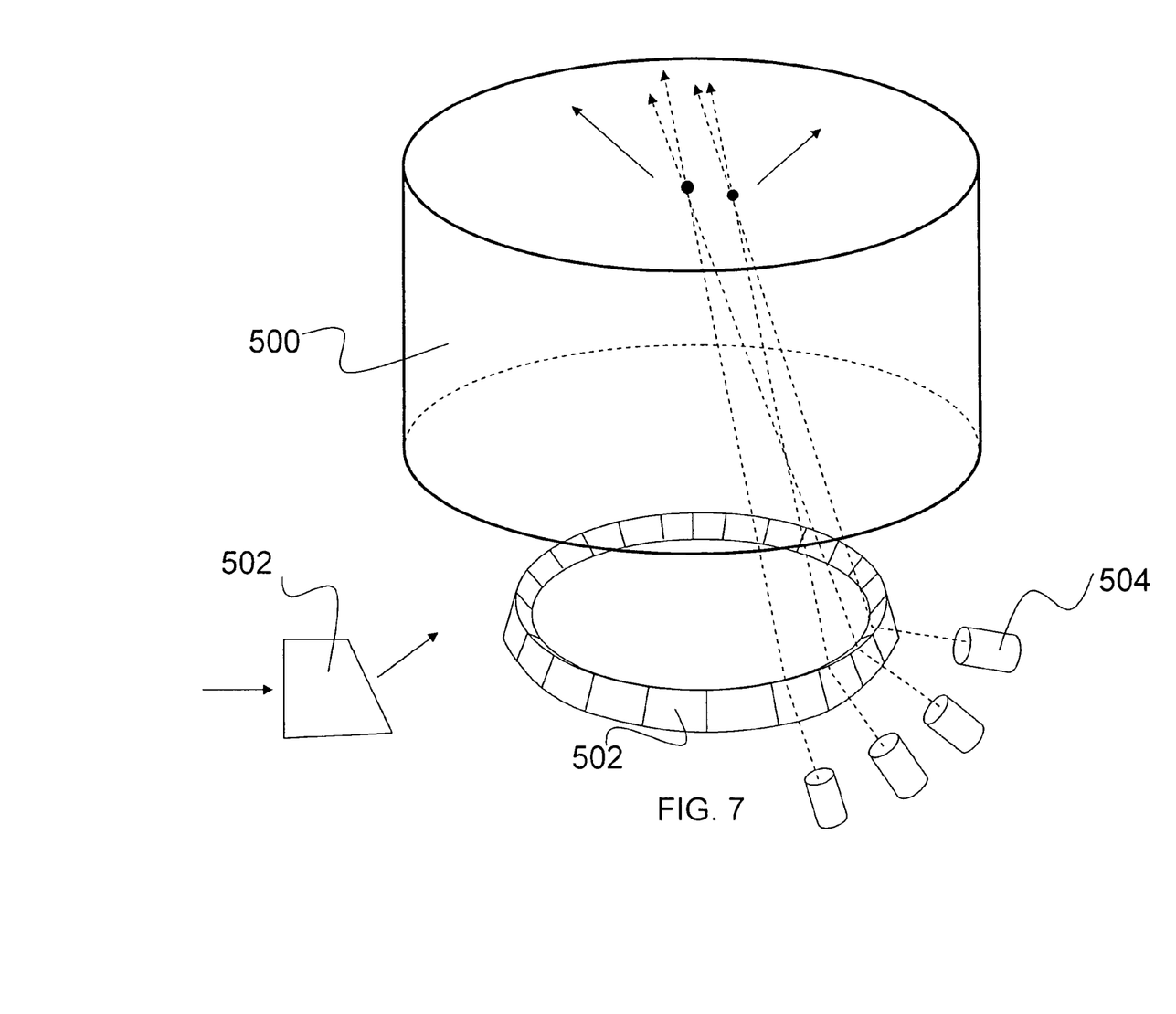
FIG. 7 is an illustration of the 3D hologram display system according to the present invention, where the image formation mechanism is depicted as a prism.
Figure 8:
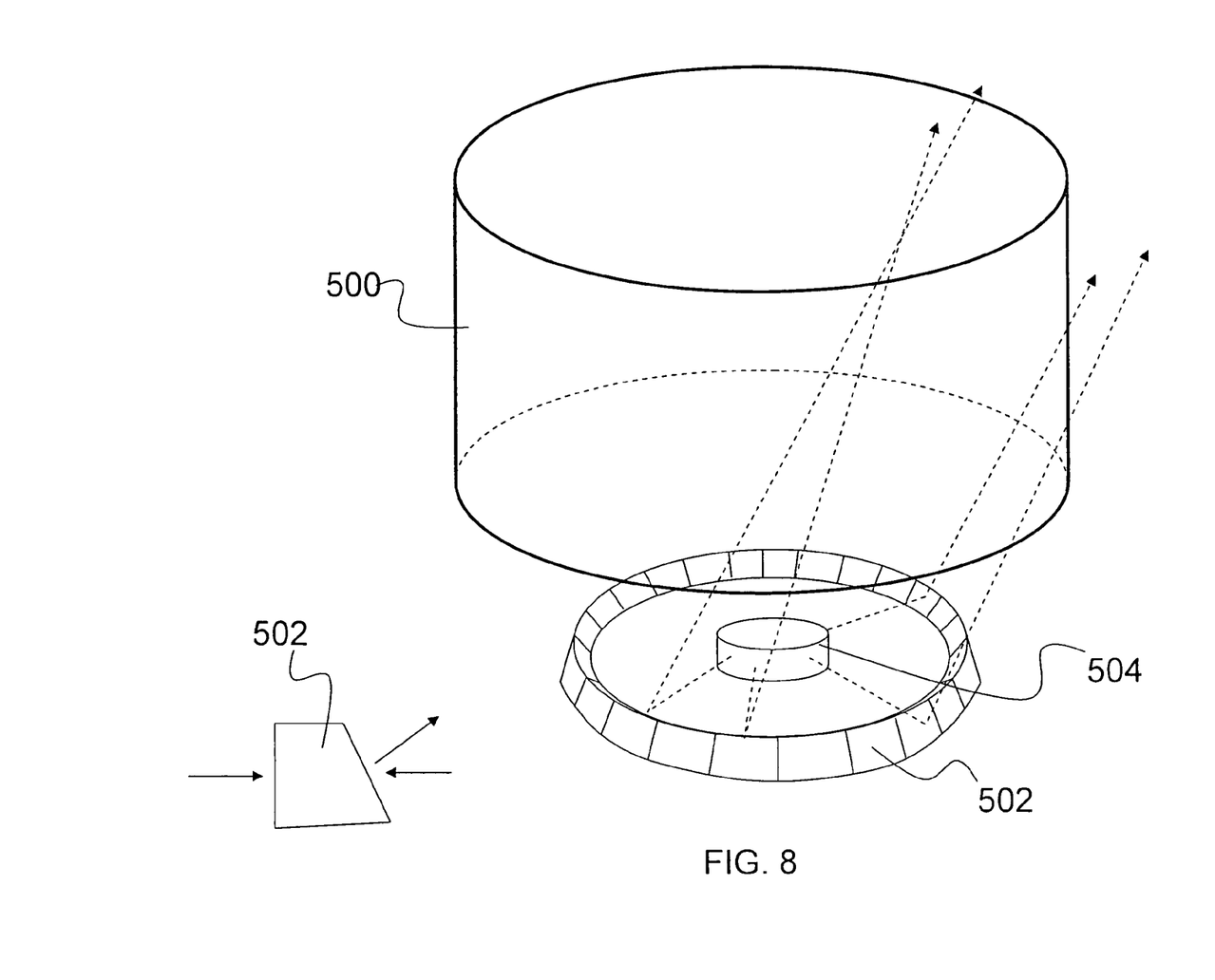
FIG. 8 is an illustration of the 3D hologram display system according to the present invention, where the image formation mechanism is depicted as a reflective device.

As shown in FIGS. 7 and 8, the projector device 504 may be mounted inside or outside the image formation mechanism 502, depending on the particular configuration. Also shown in FIGS. 7 and 8, the image formation mechanism 502 is either a prism array or reflector array, depending upon which direction the image is being projected from and upon the circular diffuser screen 500, and upon the particular application.

Note that the stereo images may either be conjugated or delayed depending on the type of viewing desired by the application. If a wide view of the hologram is necessary, then stereo glasses are used. If a single viewer for each aspect of the hologram is desired, then a conjugated display will be chosen.

In order to project a number of static or dynamic 3D images at a suitable display matrix which can be viewed from any angle on a single plane, the angle θ depends on the pitch (LS Pitch) of the projector lenses (on the projector device), the focal depth (Rlfocus) and the index of refraction (N=?). The index of refraction is dependent upon the angle of refraction $\theta_{ir}$.

The horizontal viewing pitch (FPPitch) on the x,y, plane will be slightly larger than that of the projector lens such that:

$$FP_{pitch} = LS_{Pitch}\left(1 + \frac{RL_{focus}}{D_{obs}}\right)$$

Dobs denotes the optimal distance of the display from the observers' eyes. The number of views Nview is distributed over the viewing plane such that the viewing density at the observers distance Dobs is expressed as:

$$\Delta X_{obs} = \frac{2(Dobs)(\tan\theta)}{N_{views}}$$

For Nview=100, this density step is VD. The viewing density VD is 2θ=19°. Thus the possible number of views Nview=100.

(4.3) Aerogel Material

Figure 9:
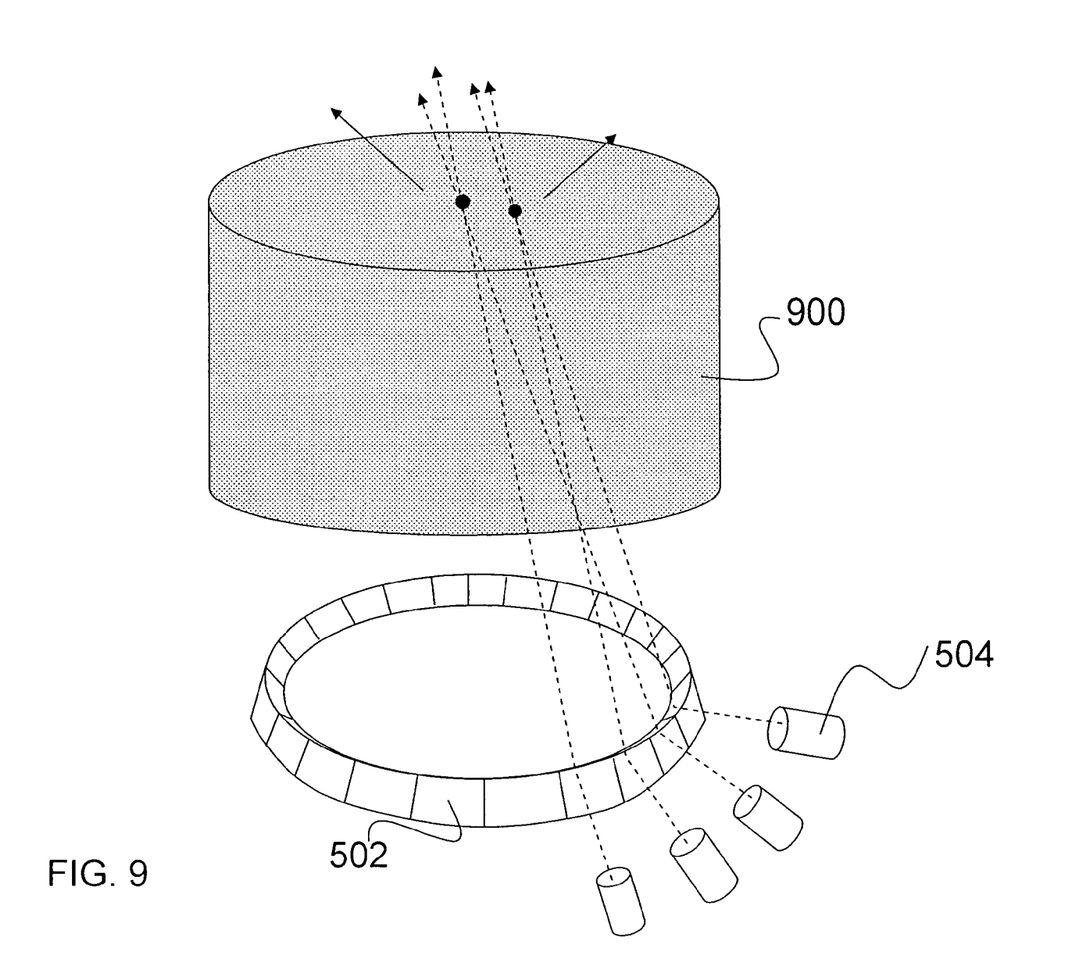
FIG. 9 is an illustration of another aspect of the 3D hologram display system, where the display medium is an aerogel material.

In another aspect and as shown in FIG. 9, the display medium is an aerogel material 900. Aerogel is a silicon-based solid with a porous, sponge-like structure in which approximately 99.8 percent of the volume is empty space. Due to having such a small density, Aerogel has a hazy, smoke-like appearance. However, enough solid exists to refract light, thereby creating a display medium that is capable of refracting and displaying a 3D image. Aerogel was invented by the National Aeronautics and Space Administration (NASA) as an insulation material and is now produced by a few companies, such as Aspen Aerogels. NASA is located at Suite 1M32, Washington, D.C. 20546-0001, U.S.A. Aspen Aerogels is located at 30 Forbes Road, Northborough, Mass. 01532, U.S.A.

Aerogel is very delicate and subject to breakage. To maintain its structure, the aerogel is contained within a column or other container-like structure. The stereoscopic images are then projected into the aerogel to form the 3D hologram. Using a projection system similar to that described above regarding the circular diffuser screen, a plurality of projector devices 504 can be used to project halves of a stereo image onto an image formation mechanism 502. The image formation mechanism 502 is used to redirect the image into the aerogel such that the halves of the stereo image converge in the aerogel as a hologram (full stereogram).

In another aspect (not shown), the holographic image is projected into the aerogel using the projector device described above regarding the spinning diffusive screen.

What is claimed is:

1. A three-dimensional hologram display system, comprising:
   a projector device comprising multiple, simultaneously-operable projectors for projecting image components, where each image component is one half of a stereo image, such that when two corresponding halves of a stereo image converge upon the display medium, they form a full stereogram;
   a display medium for displaying an image from the projector device as a holographic image, such that a viewer can view the holographic image from multiple view points, whereby when the holographic image is projected upon the display medium, a viewer can view different aspects of the holographic image from different angles.

2. A three-dimensional hologram display system as set forth in claim 1, further comprising an image formation mechanism for redirecting the image components onto the display medium to form the holographic image.

3. A three-dimensional hologram display system as set forth in claim 2, wherein the image formation mechanism is selected from a group consisting of multiple refracting prisms and multiple reflecting mirrors.

4. A three-dimensional hologram display system as set forth in claim 3, wherein the display medium is selected from a group consisting of a circular diffuser screen, and aerogel.

5. A three-dimensional hologram display system as set forth in claim 4, wherein the image formation mechanism is formed in a ring-shape such that the image components can be reflected to the interior of the display medium.

6. A three-dimensional hologram display system as set forth in claim 5, wherein each multiple, simultaneously-operable projector is positioned such that each half of the stereo image is refracted/reflected by every other prism or mirror in the image formation mechanism to converge upon the display medium and form the holographic image.

7. A three-dimensional hologram display system as set forth in claim 6, further comprising a processor configured for processing the image and presenting the image to the projector device to be projected as a 3D hologram onto the display medium.

8. A three-dimensional hologram display system as set forth in claim 7, wherein the projector device is positioned such that it is within the ring-shape of the image formation mechanism.

9. A three-dimensional hologram display system as set forth in claim 7, where the projector device is formed in a circular mounting frame such that it surrounds the ring-shape of the image formation mechanism.

10. A three-dimensional hologram display system as set forth in claim 1, wherein the projector device further includes:
- three grayscale spatial light modulators (SLM) that are used to display red, green, and blue (RGB) data separately, where the RGB data is received from a graphic 3D data processor;
- three red, green, and blue light sources to illuminate each SLM with three beams;
- an achromatic, optics light ray combiner to combine the three beams to become a collinear beam; and
- an input lens for passing the collinear beam through the input lens to illuminate the display medium.

11. A three-dimensional hologram display system as set forth in claim 10, wherein the display medium is selected from a group consisting of a spinning diffusive screen and aerogel.

12. A three-dimensional hologram display system as set forth in claim 1, further comprising an image formation mechanism for redirecting the image onto the display medium to form the holographic image.

13. A three-dimensional hologram display system as set forth in claim 12, wherein the image formation mechanism is selected from a group consisting of multiple refracting prisms and multiple reflecting mirrors.

14. A three-dimensional hologram display system as set forth in claim 12, wherein the image formation mechanism is formed in a ring-shape such that the image can be reflected to the interior of the display medium.

15. A three-dimensional hologram display system as set forth in claim 14, where the projector device is formed in a circular mounting frame such that it surrounds the ring-shape of the image formation mechanism.

16. A three-dimensional hologram display system as set forth in claim 12, wherein the projector device is positioned such that it is within the ring-shape of the image formation mechanism.

17. A three-dimensional hologram display system as set forth in claim 1, wherein each multiple, simultaneously-operable projector is positioned such that each half of the stereo image is refracted/reflected by every other prism or mirror in the image formation mechanism to converge upon the display medium and form the holographic image.

18. A three-dimensional hologram display system as set forth in claim 1, wherein the display medium is selected from a group consisting of a spinning diffusive screen, a circular diffuser screen, and aerogel.

19. A three-dimensional hologram display system as set forth in claim 1, further comprising a processor configured for processing the image and presenting the image to the projector device to be projected as a 3D hologram onto the display medium.

* * * * *